(12) United States Patent
Marocco et al.

(10) Patent No.: US 9,892,455 B2
(45) Date of Patent: Feb. 13, 2018

(54) SYSTEMS AND METHODS FOR ENRICHING THE SEARCHABILITY OF A TRANSACTION

(71) Applicant: Bank of America Corporation, Charlotte, NC (US)

(72) Inventors: Nathaniel B. Marocco, Chicago, IL (US); John E. Scully, Chicago, IL (US); Catherine A. Worth, Jacksonville, FL (US); Brian T. Pack, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 686 days.

(21) Appl. No.: 14/532,083

(22) Filed: Nov. 4, 2014

(65) Prior Publication Data
US 2016/0125523 A1 May 5, 2016

(51) Int. Cl.
*G06Q 40/00* (2012.01)
*G06Q 20/10* (2012.01)
*G06Q 20/40* (2012.01)

(52) U.S. Cl.
CPC ............. *G06Q 40/00* (2013.01); *G06Q 20/10* (2013.01); *G06Q 20/405* (2013.01)

(58) Field of Classification Search
CPC ....... G06Q 40/04; G06Q 20/10; G06Q 20/405
See application file for complete search history.

(56) References Cited

U.S. PATENT DOCUMENTS

| | | |
|---|---|---|
| 6,336,139 B1 | 1/2002 | Feridun et al. |
| 6,895,575 B2 | 5/2005 | Dharamshi |
| 7,065,745 B2 | 6/2006 | Chan |
| 7,698,243 B1 | 4/2010 | Hauser |
| 7,702,603 B1 | 4/2010 | Hauser |
| 7,702,604 B1 | 4/2010 | Hauser |
| 7,912,804 B1 | 3/2011 | Talwar et al. |
| 7,970,724 B1 | 6/2011 | Hauser |
| 7,984,021 B2 | 7/2011 | Bhide et al. |
| 8,185,488 B2 | 5/2012 | Chakravarty et al. |
| 8,463,889 B2 | 6/2013 | Zhou et al. |
| 8,473,508 B2 | 6/2013 | Padala et al. |

(Continued)

*Primary Examiner* — Lalita M Hamilton
(74) *Attorney, Agent, or Firm* — Weiss & Arons LLP; Michael A. Springs, Esq.

(57) ABSTRACT

Methods for enriching the searchability of a transaction are provided. Methods may include receiving a raw transactional data feed at a preference rules engine. The raw transactional data feed may be associated with a transaction. Methods may include transmitting a request, from the preference rules engine to a data warehouse, for enriched transaction detail associated with a transaction identification number. The transaction identification number may be associated with the transaction. The request may include the transaction identification number. Methods may include receiving, at the preference rules engine, the transaction identification number with enriched transaction detail from the data warehouse. Methods may include appending, at the preference rules engine, the enriched transaction detail to the raw transactional data feed, thereby creating a revised transaction. Methods may include transmitting the revised transaction to a database. Methods may include transmitting the revised transaction from the database to a secondary database.

14 Claims, 7 Drawing Sheets

(56) References Cited

U.S. PATENT DOCUMENTS

| | | | |
|---|---|---|---|
| 2007/0124242 A1* | 5/2007 | Reis, Jr. | G06Q 20/10 705/39 |
| 2007/0239786 A1* | 10/2007 | Grear | G06F 17/30569 |
| 2009/0319429 A1* | 12/2009 | Scully | G06Q 40/02 705/50 |
| 2010/0078472 A1* | 4/2010 | Lin | G06Q 20/32 235/379 |
| 2010/0082481 A1* | 4/2010 | Lin | G06Q 20/042 705/41 |
| 2011/0302122 A1 | 12/2011 | Klein et al. | |
| 2012/0173467 A1 | 7/2012 | Patoskie | |
| 2012/0185387 A1* | 7/2012 | Doyle | G06Q 40/00 705/42 |
| 2014/0195839 A1 | 7/2014 | Chueh et al. | |

* cited by examiner

SYSTEMS AND METHODS FOR ENRICHING THE SEARCHABILITY OF A TRANSACTION

FIELD OF TECHNOLOGY

The disclosure relates to transactional information. Specifically, the disclosure relates to enriching information associated with a transaction.

BACKGROUND OF DISCLOSURE

Conventionally, transactions, such as wire transfers, electronic funds transfers ("EFT"), and checks, contained limited information regarding the transaction.

In such circumstances, a beneficiary of a transaction may be unaware of the entity that transmitted the funds, the financial institutions which handled the funds, and/or the status of transmission fees which were deducted in the transfer process, as well as other important information.

Therefore, a need exists for the beneficiary and/or the beneficiary financial institution to extract additional information pertaining to the transaction. The additional information may be appended to the transaction, thereby presenting the beneficiary, or any other suitable party, with complete transaction information.

An apparatus and methods, as described below, provide the capability to present an end user, or any other suitable party, with a transaction enriched with additional information.

SUMMARY OF THE DISCLOSURE

An apparatus for enriching the searchability of a transaction is provided. The apparatus may include a preference rules engine. The preference rules engine may include a receiver. The receiver may be configured to receive a raw transactional data feed. The feed may be associated with a transaction. The raw transactional data feed may include a transaction identification number.

The preference rules engine may also include a transmitter. The transmitter may be configured to transmit the transaction identification number to a data warehouse.

The receiver may also be configured to receive, from the data warehouse, the transaction identification number with enriched transaction detail associated with the transaction identification number.

The preference rules engine may also include a processor. The processor may be configured to merge the received enriched transaction detail with the raw transactional data feed, thereby creating an enriched transactional data feed.

The preference rules engine may also include a transmitter. The transmitter may be configured to transmit the enriched transactional data feed from the preference rules engine to a database.

The apparatus may also include a second transmitter. The second transmitter may be configured transmit the revised transaction from the database to a secondary database.

The second transmitter may also be configured to transmit the revised transaction from the secondary database to an administrative interface. The second transmitter may also be configured to transmit the revised transaction from the secondary database to a reporting hub. Such information is found in co-pending commonly assigned U.S. patent application Ser. No. 14/506,874 filed on Oct. 6, 2014, which is hereby incorporated by reference herein in its entirety.

It should be appreciated that the transmitter included in the preference rules engine and the second transmitter may be the same transmitter.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
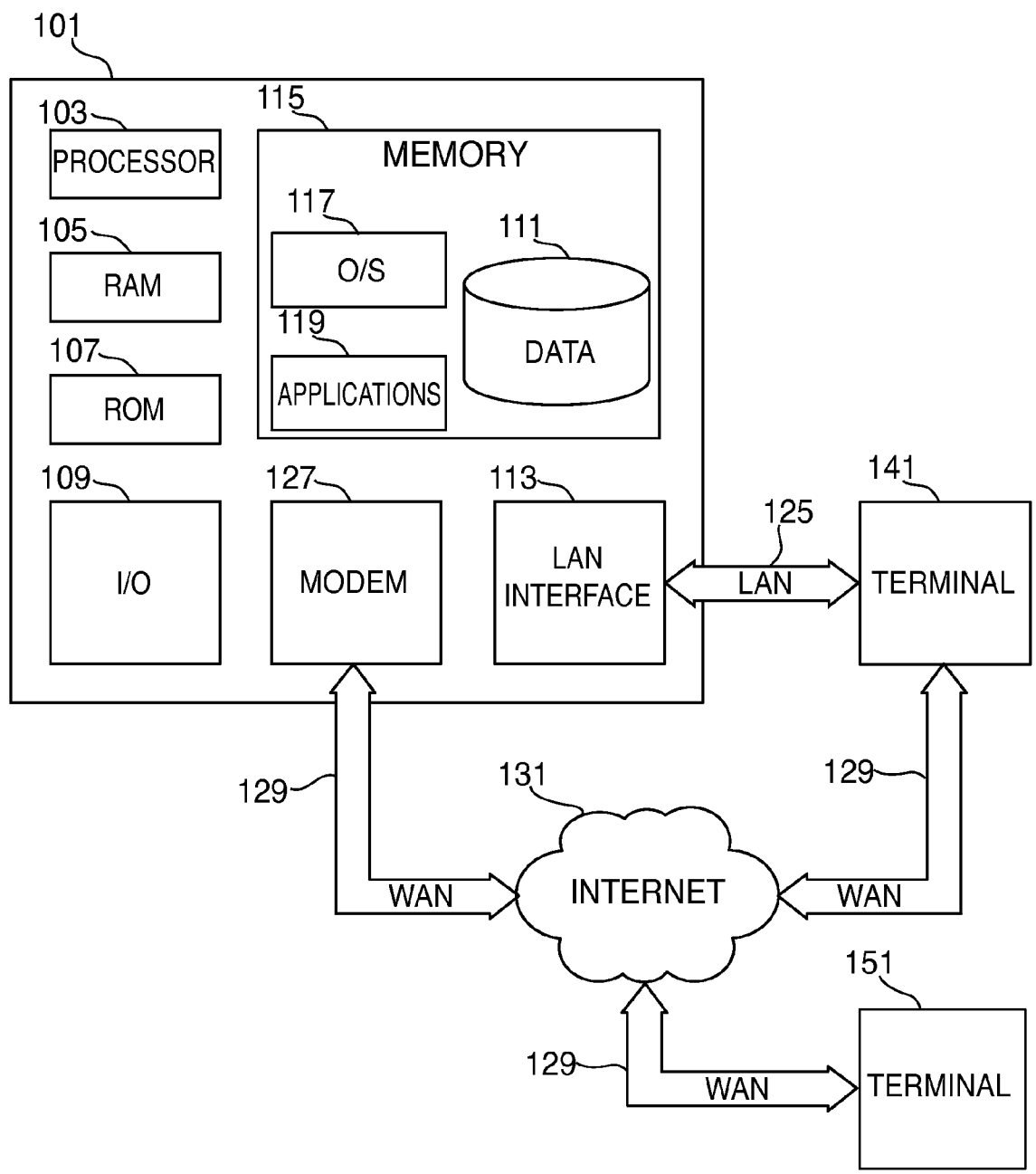
FIG. 1 shows illustrative apparatus in accordance with the principles of the invention.

A method for enriching the searchability of a transaction is provided. The method may include receiving a raw transactional data feed. The raw transactional data feed may be associated with the transaction. The raw transactional data feed may also include information pertaining to the transaction. The information may include an identifying number or code associated with the transaction. The information may also include an amount associated with the transaction.

The receiving of the transactional data feed may occur at a strategic platform. A strategic platform may be a processor, engine, a combination of computing equipment, or any other suitable computing device.

The method may also include creating a trigger. The trigger may be based on the raw transactional data feed. The trigger may be created at the strategic platform.

The method may also include determining, by the trigger, additional data which should be included in the transaction. The determining may occur at the strategic platform.

The additional data may include a beneficiary name associated with the transaction. The additional data may also include beneficiary information associated with the beneficiary name. The beneficiary information may include an address, telephone number, or other relevant information associated with the beneficiary. The additional data may also include a clearing date associated with the transaction.

The additional data may also include intermediary banking information associated with the transaction. Intermediary banking information may include where and how the transaction was transferred. For example, an originating bank may transfer funds to an intermediary bank, and the intermediary bank may transfer the funds to a correspondent bank, which may deposit the funds in the transaction beneficiary's bank account. The intermediary banking information may include details pertaining to the transaction, such as name of intermediary bank.

The additional data may also include a transaction map associated with the transaction. A transaction map may be a detailed explanation of how and where the transaction was transmitted.

The method may also include transmitting a request from the trigger, at the strategic platform, to a data warehouse. The request may include a query for the additional data.

The method may also include receiving the additional data from the data warehouse, at the strategic platform.

The data in the data warehouse may include a beneficiary name, beneficiary information associated with the beneficiary name, a clearing date associated with the transaction, intermediary banking information associated with the transaction, a transaction map associated with the transaction, and any other suitable information.

The method may also include appending the additional data to the raw transactional data feed, thereby creating a revised transaction, at the strategic platform.

The method may also include transmitting the revised transaction to a database.

The method may also include transmitting the revised transaction from the database to a secondary database.

The method may also include transmitting the revised transaction from the secondary database to an administrative interface. An administrative interface may be a user interface for a treasury application.

The method may also include transmitting the revised transaction from the secondary database to a reporting hub. A reporting hub may be a data configuration utility. A data configuration utility may enable configuration of the transactional data in a format selected and/or modified by a user.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the embodiments may be embodied as a method, a data processing system, or a computer program product. Accordingly, the embodiments may take the form of an entirely hardware embodiment, an entirely software embodiment or an embodiment combining software and hardware aspects.

Furthermore, embodiments may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Exemplary embodiments may be embodied at least partially in hardware and include one or more databases, receivers, transmitters, processors, modules including hardware and/or any other suitable hardware. Furthermore, operations executed may be performed by the one or more databases, receivers, transmitters, processors and/or modules including hardware.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for transferring information input into one or more of the database(s) described herein, as well as entity information, financial institution information, entity account information, entity software information, etc.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of the embodiments set forth herein. Information input may be stored in memory 115. The input information may be processed by an application such as one of applications 119.

Figure 2:
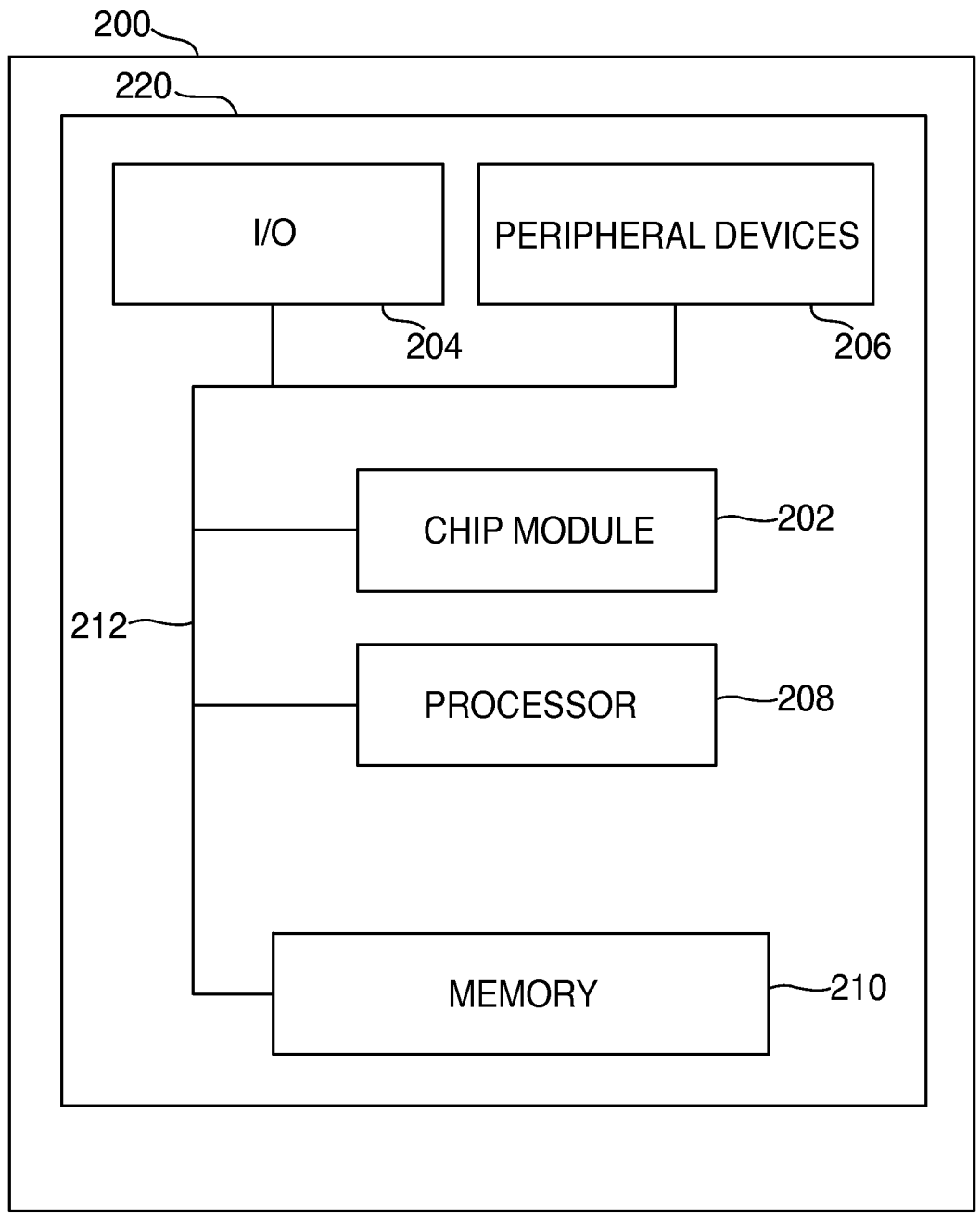
FIG. 2 shows illustrative apparatus in accordance with the principles of the invention.

FIG. 2 shows illustrative apparatus 200. Apparatus 200 may be a computing machine. Apparatus 200 may be included in apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include the transmitter device and the receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device ("processor") 208, which may compute data structural information, structural parameters of the data; and machine-readable memory 210.

Machine-readable memory 210 may be configured to store in machine-readable data structures: financial institution ("FI") information, entity account information; entity information and any other suitable information or data structures.

Components 202, 204, 206, 208 and 210 may be coupled together by a system bus or other interconnections 212 and may be present on one or more circuit boards such as 220. In some embodiments, the components may be integrated into a single silicon-based chip.

Apparatus 200 may operate in a networked environment supporting connections to one or more remote computers via a local area network (LAN), a wide area network (WAN), or other suitable networks. When used in a LAN networking environment, apparatus 200 may be connected to the LAN through a network interface or adapter in I/O circuitry 204. When used in a WAN networking environment, apparatus 200 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 208, for example over the Internet.

Apparatus 200 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Figure 3:
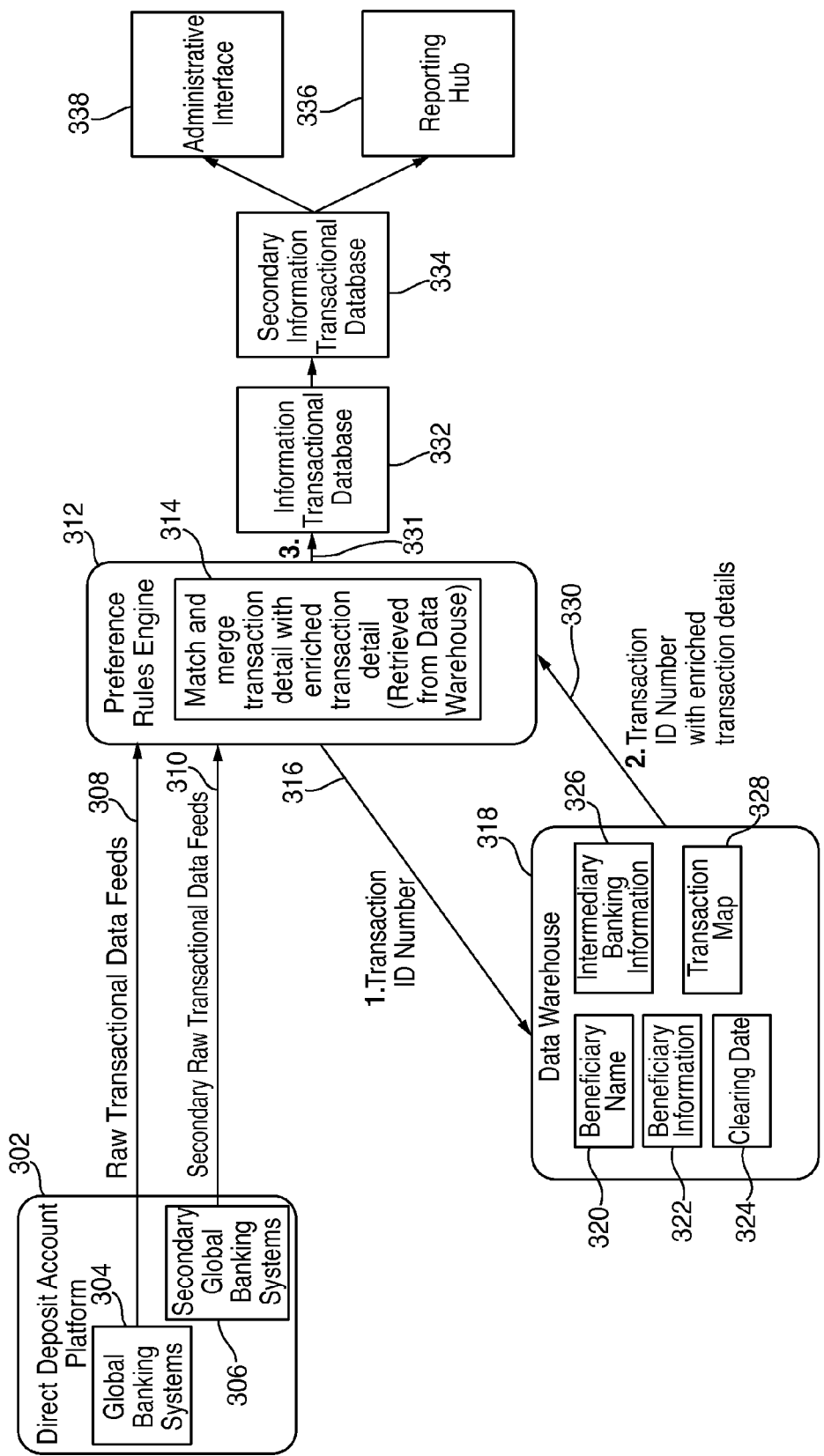
FIG. 3 shows an illustrative diagram in accordance with the principles of the invention.

FIG. 3 shows an exemplary process flow for enriching the searchability of a transaction. Direct deposit account platform 302 may include global banking systems 304. Direct deposit account platform 302 may also include secondary global banking systems 306.

Global banking systems 304 may include raw transactional data feeds. Raw transactional data feeds may include information pertaining to transactions. The transactional data feeds may not include all of the detail regarding the transaction.

The raw transactional data feeds may be transmitted to preference rules engine 312 via communication line 308. The secondary raw transactional data feeds may be transmitted to preference rules engine 312 via communication line 310.

Preference rules engine 312 may extract a transaction ID number, or other identifying information, from the raw transactional data feeds. Engine 312 may transmit the transaction ID number to data warehouse 318, via communication line 316.

Data warehouse 318 may access transaction detail which was not included in the raw transactional data feeds. Data warehouse 318 may include beneficiary name 320. Beneficiary name 320 may be the name of the beneficiary of the transaction. Data warehouse 318 may also include beneficiary information 322. Beneficiary information 322 may be information regarding the beneficiary of the transaction, for example, address of the beneficiary, phone number of the beneficiary, etc.

Data warehouse 318 may also include clearing data 324. Clearing date 324 may be the date that the transaction cleared at a financial institution. Data warehouse 318 may also include intermediary banking information 326. Intermediary banking information 326 may include information regarding financial institutions which acted as intermediaries with regard to the transaction.

Data warehouse 318 may also include transaction map 328. Transaction map 328 may be a detailed explanation of how and where the transaction was transmitted.

Data warehouse may transmit the transaction ID number with enriched transaction details to the preference rules engine 312, via communication line 330.

Preference rules engine 312 may match and merge the transaction detail, which was received from the raw transactional data feeds, with the enriched transactional detail, which was retrieved from data warehouse 318.

The enriched transaction may be transmitted from preference rules engine 312 to informational transactional database 332, via communication line 331.

The enriched transaction may be transmitted from information transactional database 332 to secondary information transactional database 334.

The enriched transaction may be transmitted from secondary information transactional database 334 to administrative interface 338. Administrative interface 338 may be a user interface for a treasury application.

The enriched transaction may also be transmitted from secondary information transactional database 334 to reporting hub 336. Reporting hub 336 may be a data configuration utility, which may enable configuration of the transactional data in a format selected and/or modified by a user.

In addition, sequence numbers 1, 2 and 3 are shown. Number 1 shows preference rules engine 312 transmit transaction ID number to data warehouse 318, via communication line 316. Number 2 shows data warehouse 318 transmit the transaction ID number with enriched transaction details to preference rules engine 312, via communication line 330. Number 3 shows preference rules engine 312 transmit a transaction with enriched transaction detail to information transactional database 332, via communication line 331.

It should be appreciated that the steps described in the above paragraph may occur in any suitable sequence, and are not limited to the one described above.

Figure 4:
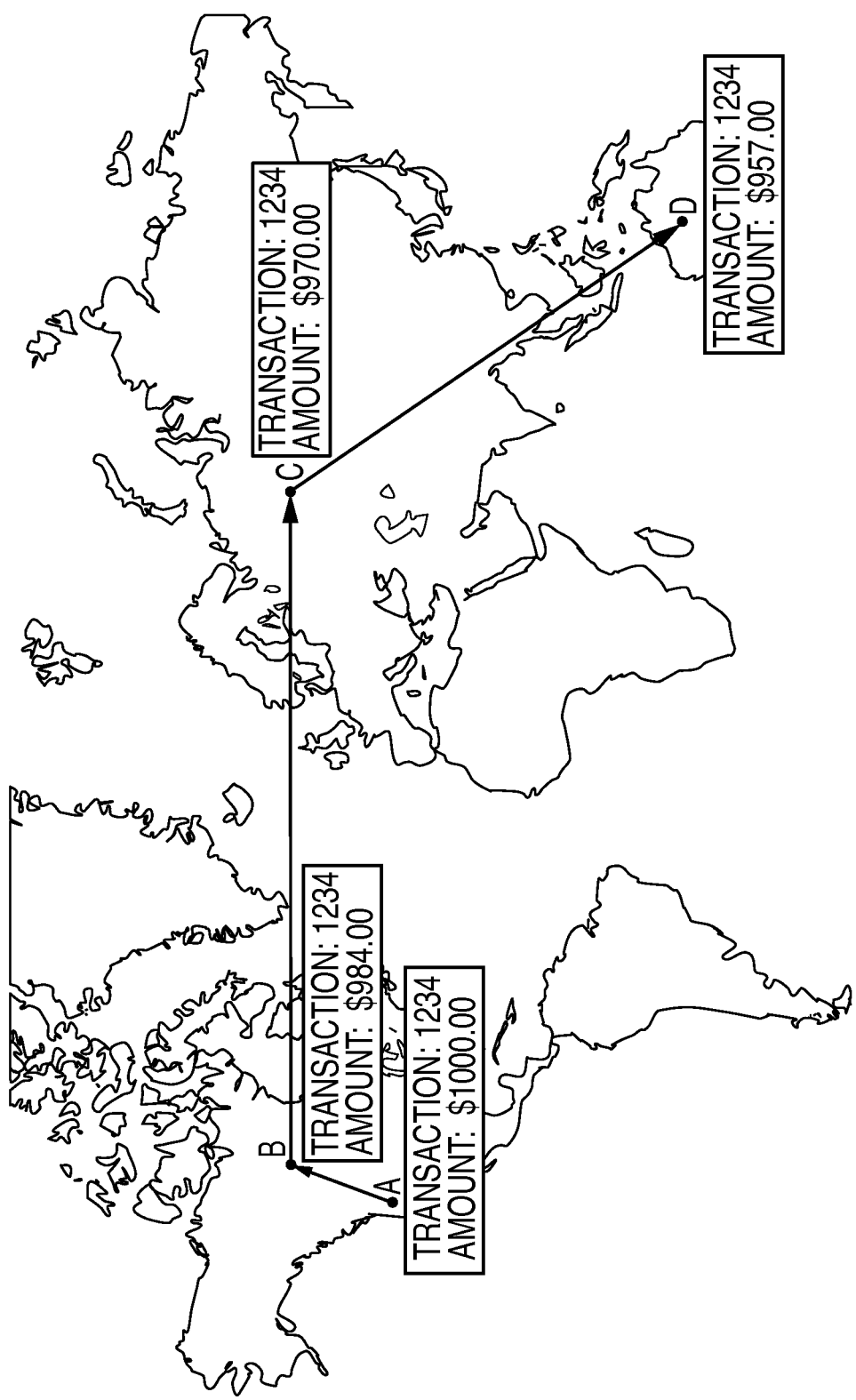
FIG. 4 shows an illustrative diagram in accordance with the principles of the invention.

FIG. 4 shows a transaction map of fictional transaction 1234. Transaction 1234 may be a wire transfer, or electronic funds transfer ("EFT"). Transaction 1234 may originate in the United States and may terminate in Australia. An entity in the United States may want to transmit 1000.00 USD to an entity in Australia. The US entity may contact a financial institution situated in the United States to execute the wire transfer. The US financial institution, as shown at point A, may receive 1000.00 USD from the US entity. The US financial institution may transfer the funds to point B, which may be a financial institution situated in Canada. Point B may receive 984.00 USD, because point A may have deducted a 16.00 USD fee for the transfer service. Point B may transfer the funds to point C, which may be a financial institution situated in Russia. Point C may receive 970.00 USD, because the financial institution situated in Canada may have deducted 14.00 USD as an international transfer fee. Point C may transfer the funds to point D, which may be a financial institution situated in Australia. Point D may receive 957.00 USD, because the Russian financial institution may have deducted 13.00 USD as an EFT transfer fee. The Australian entity, which may be the beneficiary of transaction 1234, may receive 957.00 USD from the Australian financial institution.

In the past, prior to the preference rules engine, the beneficiary may not be aware why the wire transfer amount was 957.00 USD, as opposed to 1,000.00 USD, which had been originally transmitted. Therefore, a beneficiary may be required to request information additional to the information which had originally been provided.

Figure 7:
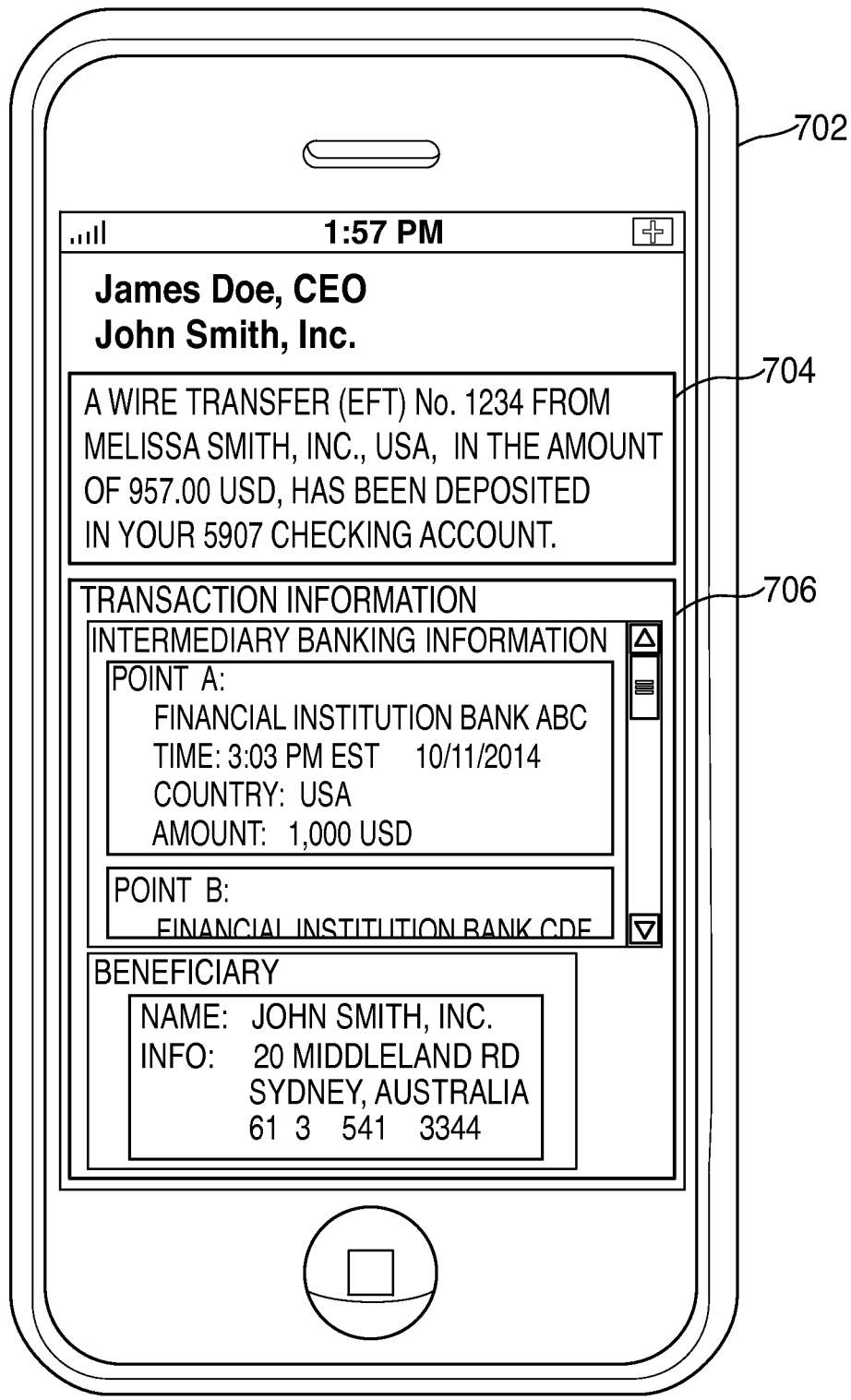
FIG. 7 shows an illustrative apparatus in accordance with the principles of the invention.

Because the preference rules engine has access to the data warehouse, which may store additional transaction information, the preference rules engine may enrich the transaction detail with additional information retrieved from the data warehouse. The additional information may include a transaction map (as described in FIG. 4), intermediary banking information (as described in FIG. 5), beneficiary information (as described in FIG. 5), and sender information (as shown in FIG. 7), as well as any other suitable information.

Figure 5:
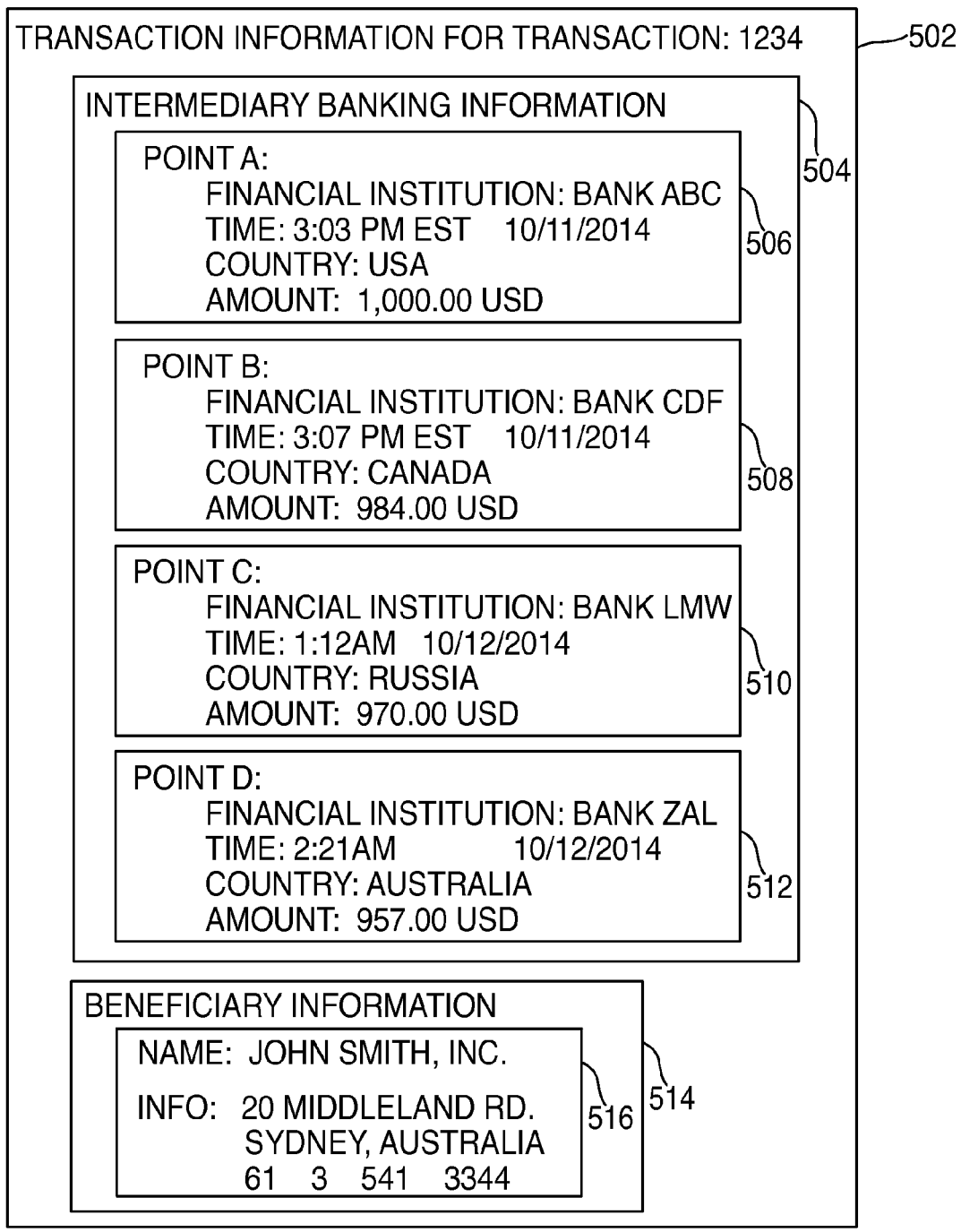
FIG. 5 shows an illustrative diagram in accordance with the principles of the invention.

FIG. 5 shows an exemplary transaction information record for fictional transaction 1234. Included in transaction information record 502 is intermediary banking information 504, and beneficiary information 514.

Intermediary banking information may include point A 506. Point A 506 may include information pertaining to transaction 1234 at point A. The financial institution at point A may be Bank ABC, which may be situated in the United States. The time of the transfer at point A may be 3:03 PM EST. The date of the transfer may be Oct. 11, 2014. The amount of the transfer may be 1000.00 USD.

Point B 508 may include information pertaining to transaction 1234 at point B. The financial institution at point B may be Bank CDF, which may be situated in Canada. The time of the transfer at point B may be 3:07 PM EST. The date of the transfer may be Oct. 11, 2014. The amount of the transfer may be 984.00 USD.

Point C 510 may include information pertaining to transaction 1234 at point C. The financial institution at point C may be Bank LMW, which may be situated in Russia. The time of the transfer at point C may be 1:12 AM. The date of the transfer may be Oct. 12, 2014. The amount of the transfer may be 970.00 USD.

Point D 512 may include information pertaining to transaction 1234 at point D. The financial institution at point D may be Bank ZAL, which may be situated in Australia. The time of the transfer may be 2:21 AM. The date of the transfer may be Oct. 12, 2014. The amount of the transfer may be 957.00 USD.

It should be appreciated that although the currency has been kept in USD for simplicity, the currency may be transferred at each financial institution to the local currency of each respective financial institution. It should also be appreciated that each financial institution may deduct an additional fee for the currency exchange.

Beneficiary information 514 may include Box 516. Box 516 may include the name of the beneficiary as well as information pertaining to the beneficiary. Examples of beneficiary information may be an address, phone number, or any other suitable information.

Figure 6:
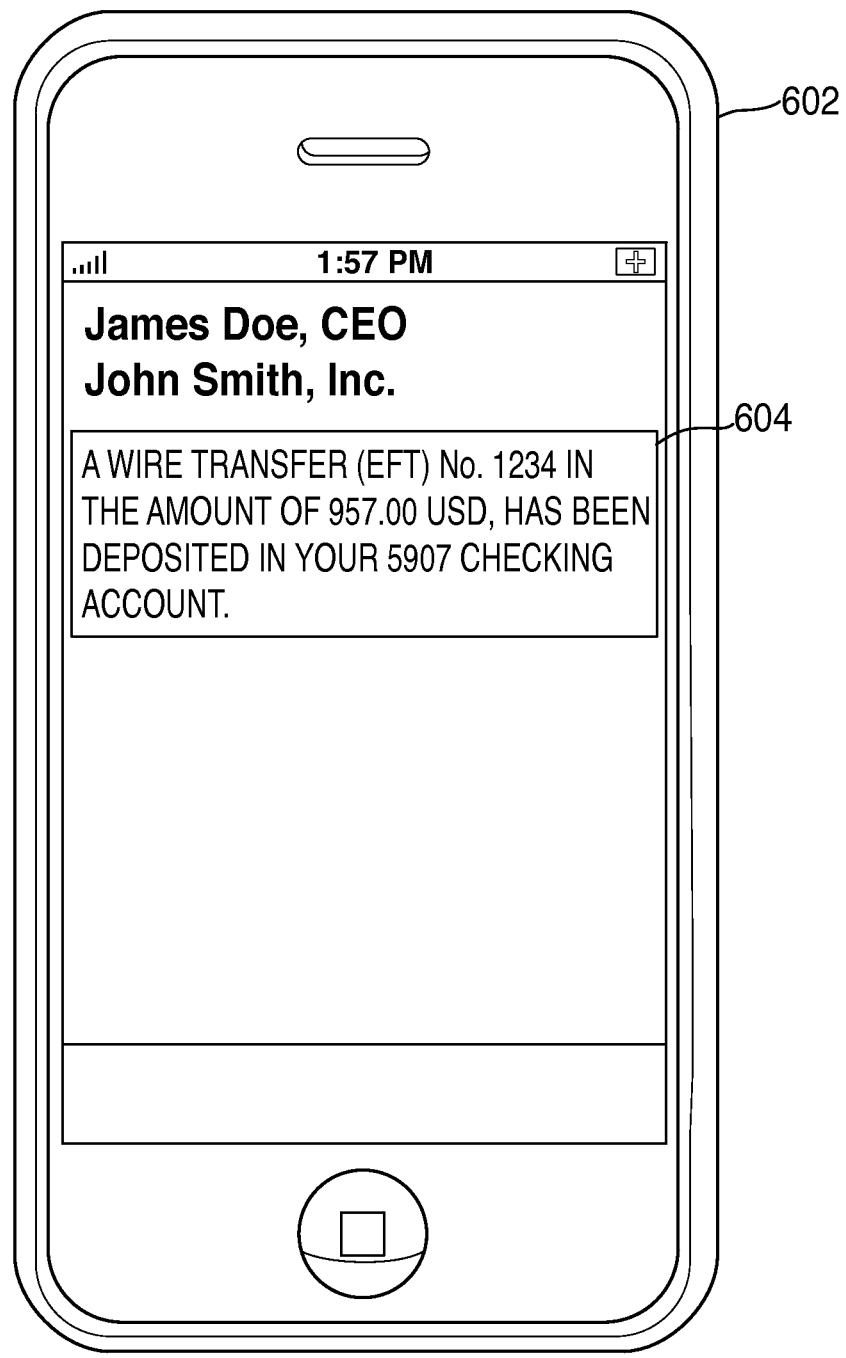
FIG. 6 shows an illustrative apparatus in accordance with the principles of the invention.

FIG. 6 shows a handheld device. James Doe may be the CEO of a fictional company John Smith, Inc. Handheld device 602 may be possessed by James Doe.

In conventional systems, when John Smith, Inc. received a wire transfer, James Doe, CEO received a message stating that John Smith, Inc. received a wire transfer, as shown in message box 604. Previously, there was scant information regarding the wire transfer. For example, the only information that has been known to James Doe, CEO, about the wire transfer has been the EFT number, the amount of the transfer, and the account into which the money was deposited.

FIG. 7 shows a handheld device. James Doe may be the CEO of a fictional company John Smith, Inc. Handheld device 702 may be possessed by James Doe.

When John Smith, Inc. receives a wire transfer, James Doe, CEO received a message stating that John Smith, Inc. received a wire transfer, as shown in message box 704.

With the use of the preference rules engine, the details of transaction 1234 are substantially complete. James Doe, CEO, can be informed of the sender, as shown in message box 704. James Doe, CEO, can also be informed of the transaction information, including intermediary banking information, and beneficiary information, which is shown in transaction information box 706.

Thus, methods and apparatus for enriching the searchability of a transaction is provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for enriching the searchability of a transaction, the method comprising:
   receiving a raw transactional data feed, associated with the transaction, at a strategic platform;
   creating a module based on the raw transactional data teed at the strategic platform;
   determining, by the module, additional data which should be included in the transaction, said including of the additional data occurring at the strategic platform;
   transmitting a request from the module, at the strategic platform, to a data warehouse, the request comprising a query for the additional data;
   receiving the additional data from the data warehouse, at the strategic platform;
   appending the additional data to the raw transactional data feed, thereby creating a revised transaction, at the strategic platform;
   transmitting the revised transaction to a database;
   transmitting the revised transaction from the database, to a secondary database;
   transmitting the revised transaction from the secondary database to an administrative interface and a reporting hub; and
   wherein the data in the data warehouse comprises a pictorial-physical-transaction-transmission map associated with the transaction.

2. The method of claim 1, wherein the data in the data warehouse comprises a beneficiary name associated with the transaction.

3. The method of claim 2, wherein the data in the data warehouse comprises beneficiary information associated with the beneficiary name.

4. The method of claim 1, wherein the data in the data warehouse comprises a clearing date associated with the transaction.

5. The method of claim 1, wherein the data in the data warehouse comprises intermediary banking information associated with the transaction.

6. One or more non-transitory computer-readable media storing computer-executable instructions which, when executed by a processor on a computer system, perform a method for enriching the searchability of a transaction, the method comprising:

receiving a raw transactional data feed, associated with the transaction, at a. preference rules engine;

transmitting a request for enriched transaction detail associated with a transaction identification number associated with the transaction, from the preference rules engine to a data warehouse, the request comprising the transaction identification number;

receiving the transaction identification number with enriched transaction detail from the data warehouse, at the preference rules engine;

appending the enriched transaction detail to the raw transactional data feed, thereby creating a revised transaction, at the preference rules engine;

transmitting the revised transaction to a database;

transmitting the revised transaction from the database to a secondary database;

transmitting the revised transaction from the secondary database to an administrative interface and a reporting hub; and wherein the data in the data warehouse comprises a pictorial-physical-transaction-transmission map associated with the transaction.

7. The method of claim 6, wherein the enriched transaction detail comprises a beneficiary name associated with the transaction.

8. The method of claim 7, wherein the enriched transaction detail comprises beneficiary information associated with the beneficiary name.

9. The method of claim 6, wherein the enriched transaction detail comprises a clearing date associated with the transaction.

10. The method of claim 6, wherein the enriched transaction detail comprises intermediary banking information associated with the transaction.

11. An apparatus for enriching the searchability of a transaction comprising:

a preference rules engine comprising:
a receiver configured to receive a raw transactional data feed associated with the transaction, the raw transactional data feed comprising a transaction identification number;

a transmitter configured to transmit the transaction identification number to a data warehouse;

the receiver configured to receive the transaction identification number with enriched transaction detail associated with the transaction identification number, from the data warehouse, said enriched transaction detailed comprising a pictorial-physical-transaction-transmission map;

a processor configured to merge the received enriched transaction detail with the raw transactional data feed, thereby creating an enriched transactional data feed;

the transmitter further configured to transmit the enriched transactional data feed from the preference rules engine to a database;

the transmitter further configured to transmit the enriched transactional data feed from the database to a secondary database;

the transmitter further configured to transmit the enriched transactional data feed from the secondary database to an administrative interface and a reporting hub.

12. The apparatus of claim 11, wherein the enriched transaction detail comprises a beneficiary name and/or beneficiary information.

13. The apparatus of claim 11, wherein the enriched transaction detail comprises a clearing date.

14. The apparatus of claim 11, wherein the enriched transaction detail comprises intermediary banking information.

* * * * *